(12) United States Patent
Kuhn et al.

(10) Patent No.: US 7,612,133 B2
(45) Date of Patent: *Nov. 3, 2009

(54) PRESTABILIZATION OF HALOGEN-CONTAINING POLYMERS

(75) Inventors: Karl-Josef Kuhn, Lautertal-Gadernheim (DE); Hans-Helmut Friedrich, Lautertal-Gadernheim (DE)

(73) Assignee: Chemtura Vinyl Additives GmbH, Lampertheim (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/897,271

(22) Filed: Aug. 28, 2007

(65) Prior Publication Data

US 2007/0299175 A1    Dec. 27, 2007

Related U.S. Application Data

(63) Continuation of application No. 10/494,408, filed on May 3, 2004, now abandoned.

(30) Foreign Application Priority Data

Dec. 4, 2001 (DE) .............................. 101 59 344
Dec. 2, 2002 (WO) ...................... PCT/EP02/13628

(51) Int. Cl.
C08K 5/00       (2006.01)
C08K 5/16       (2006.01)
C08F 214/06     (2006.01)
C08L 27/00      (2006.01)

(52) U.S. Cl. .................... 524/186; 524/236; 524/465; 524/567; 524/700

(58) Field of Classification Search ................ 524/186, 524/236, 465, 567, 700
See application file for complete search history.

(56) References Cited

U.S. PATENT DOCUMENTS

| | | | | |
|---|---|---|---|---|
| 2,972,617 | A * | 2/1961 | Cislak | 546/186 |
| 3,657,183 | A * | 4/1972 | Stretanski et al | 524/96 |
| 3,862,066 | A * | 1/1975 | Reiter et al. | 524/728 |
| 4,624,980 | A * | 11/1986 | Rekers et al. | 524/238 |
| 4,861,816 | A * | 8/1989 | Kobayashi et al. | 524/204 |
| 4,957,954 | A * | 9/1990 | Iizuka et al. | 524/102 |
| 5,034,443 | A * | 7/1991 | Bae et al. | 524/180 |
| 5,575,951 | A * | 11/1996 | Anderson | 252/400.1 |
| 2004/0054043 | A1* | 3/2004 | Friedrich et al. | 524/244 |
| 2004/0259988 | A1* | 12/2004 | Kuhn et al. | 524/186 |
| 2006/0052497 | A1* | 3/2006 | Hopfmann et al. | 524/236 |

* cited by examiner

*Primary Examiner*—Nathan M Nutter
(74) *Attorney, Agent, or Firm*—Jaimes Sher

(57) ABSTRACT

The invention relates to a process for preparing a stabilized suspension/emulsion polymer of halogen-containing monomers with addition of a polymer stabilizer mixture compatible with the polymerization medium prior to, during or directly after the polymerization process, and to the polymers prepared by this process.

11 Claims, No Drawings

PRESTABILIZATION OF HALOGEN-CONTAINING POLYMERS

This application is a continuation of U.S. patent application Ser. No. 10/494,408, filed May 3, 2004, and now abandoned.

The invention relates to a process for preparing a stabilized suspension/emulsion polymer of halogen-containing monomers with addition of a polymer stabilizer mixture compatible with the polymerization medium prior to, during or directly after the polymerization process, and to the polymers prepared by this process.

Suspension or emulsion homopolymers and copolymers of halogen-containing monomers have limited thermal stability which has to be optimized by adding various stabilizer systems or combinations of these so that the materials can be processed to give industrially useful final products.

PVC polymerization may be taken here as an example of the polymerization of halogen-containing polymers. In PVC polymerization, the polymer is mostly prepared in aqueous systems in the form of suspension, microsuspension or emulsion PVC. In this process, the monomer(s) is/are added to the aqueous polymerization medium composed of a mixture of polymerization catalyst (initiator), dispersion systems, agents to prevent adhesion, (protective) colloids or dispersants, and the polymerization is carried out. Once the reaction has ended, the polymer formed is processed by spray drying to give polymer powder or is isolated by filtration, centrifuging, or similar separation steps, and where appropriate washed and finally dried at elevated temperatures.

The drying generally leads to the first thermal stress placed on the polymer and should therefore in principle be carried out very gently in order to prevent thermal degradation and associated discoloration of the vinyl polymer.

The drying gives a white or near-white fine powder which can then be treated with other additives, processing aids, and also heat or light stabilizers and can be processed with heat in the melt or on rolls or in kneaders, extruders, or other equipment, to give the desired final products (mouldings, etc.).

The optimized polymer mixture for the particular application can only be made available by adding additives, modifiers and/or other stabilizers of varying type.

Until now the polymer has always been stabilized only after its isolation from the aqueous reaction medium of the polymerization reactor, since there have been no available stabilizers which are compatible with the polymerization medium or soluble therein. A polymerization medium based on water is usually used. The stabilizer systems used hitherto are not only incompatible or insoluble in the polymerization medium but are also incompatible or insufficiently compatible with the polymerization process. This means that they can lead to coagulation (breaking of the polymer dispersion) or even inhibit the polymerization and thus lead to yield losses or worse. Attempts to stabilize the polymer dispersion have therefore hitherto been unsuccessful.

JP 61-009451 indicates a stabilizer system specifically for PVC, composed of a combination of ethanolamine and perchloric acid. This involves perchlorate salts with ammonium salt structure, and these can be obtained by adding primary, secondary or tertiary ethanolamines to a perchloric acid solution.

Ammonium perchlorate salts are generally compounds which are sensitive to heat and shock and therefore are accompanied by a certain risk of explosion, making them unsuitable for large-scale industrial applications in plastics processing. This combination is used only after polymerization has ended, since the components have an adverse effect on the polymerization procedure. The molar ratios in which the components have to be used also severely restrict the ideal range of use of the stabilizer combination.

EP 0 281 210 describes a stabilizer system composed of a homogenized suspension of an antioxidant which is insoluble in the polymerization mixture and has to be added to the modified polymerization mixture towards the end of the polymerization of vinyl chloride, but is not effective against the known ionic thermal degradation of PVC.

U.S. Pat. No. 4,252,705 discloses stabilizer systems for PVC, but these are based on insoluble N,N'-diphenylurea and severely restrict the scope of application of the resultant PVC.

Other additives usually used for post-stabilization of finished PVC powders cannot be used because of incompatibility or hydrolytic decomposition.

For example, the halogen-containing polymer PVC can be stabilized by a number of additives. Compounds of the heavy metals lead, barium and cadmium are particularly well suited to this purpose, but are nowadays subject to criticism on environmental grounds or due to their heavy metal content; other stabilization systems based on Ca/Zn or tin or based on organic materials are also known, but for the reasons mentioned cannot be used for prestabilization (cf. "Kunststoffadditive" [Plastics additives], R. Gächter/H. Müller, Carl Hanser Verlag, 3rd edn. 1989, pages 303-311 (see also 4th edition of 2001) and "Kunststoff Handbuch PVC" [Plastics Handbook PVC], volume 2/1, W. Becker/D. Braun, Carl Hanser Verlag, 2nd edn., 1985, pages 531-538; and also Kirk-Othmer: "Encyclopedia of Chemical Technology", 4th ed. 1994, Vol. 12, Heat Stabilizers, pp. 1071-1091).

It has now been found that the stabilization of the halogen-containing polymer can take place while the polymerization medium is still present, prior to isolation of the polymer from its mother liquor or prior to breakdown (breaking) of the polymer dispersion. For the purposes of this invention, the general term polymerization medium encompasses dispersion systems, colloid systems, emulsion systems or suspension systems, i.e. various systems which can arise during polymerization of halogen-containing monomers. The term polymerization of halogen-containing monomers also encompasses copolymerization of halogen-containing monomers with one or more non-halogen-containing monomers or a mixture of these.

This means that, even though the reaction medium is mostly aqueous, stabilization can take place prior to, during and after the polymerization.

Surprisingly, this addition of substances foreign to the polymerization has no adverse effect on the polymerization medium. Nor is there any adverse effect on polymerization activity and polymer yield, and indeed in some cases the yields found are higher.

The invention therefore provides a process for preparing a stabilized suspension/emulsion polymer of halogen-containing monomers with addition of a polymer stabilizer mixture compatible with the polymerization medium prior to, during or directly after the polymerization process.

To this end, the stabilizer system is added to or dissolved in the polymerization medium by the usual laboratory methods, directly in the form of a solid or mixture of solids, or in the form of a solution or dispersion in a suspension medium or, respectively, solvent compatible with the polymerization medium. The addition may take place prior to, during, or after the polymerization. The dispersion medium is then, where appropriate, separated off and the polymeric product is dried. Commonly used industrial methods such as filtration, centrifuging, or else preferably spray drying are used to remove the dispersion medium. This gives a very intimate mixture of the stabilizer system with the polymer, and even during the required first drying of the polymer powder the stabilizer can begin to exert its stabilizing action and thus prevent thermal degradation during the drying procedure. In addition, its incorporation into the polymer is more thorough than in the processes which have been carried out hitherto and do not bring the stabilizer system into contact with the polymer until drying is complete. The result of this intimate contact of the stabilizer system with the polymer is substantially less initial thermal stress on the polymer for incorporation of the stabilizer into the polymer network; indeed, this stress can be avoided completely, since thermal shaping can take place directly without any further stabilization. Nevertheless, it is also possible for the identical additional stabilizing materials to be added subsequently to the resultant polymer powders in the usual way—if necessary.

It has been found that stabilizer mixtures which are compatible with the polymerization medium, i.e. which are compatible with the dispersion/emulsion systems of the polymerization and with the polymerization process, can be used in the process of the invention. In particular, these stabilizer systems may be systems which are water-soluble and dispersion-compatible.

The present invention therefore provides a process for preparing a stabilized suspension/emulsion polymer of halogen-containing monomers with addition of a polymer stabilizer mixture compatible with the polymerization medium prior to, during or directly after the polymerization process, characterized in that the polymer stabilizer mixture encompasses at least a) a perchlorate and/or b) an alkanolamine of the formula (I)

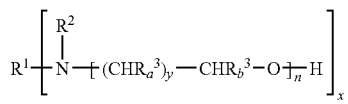

where x=1, 2 or 3;

y=1, 2, 3, 4, 5 or 6;

n=from 1 to 10;

$R^1$, $R^2$=independently of one another H, $C_1$-$C_{22}$-alkyl, —[—(CHR$^3_a$)$_y$—CHR$^3_b$—O—]$_n$—H, —[—(CHR$^3_a$)$_y$—CHR$^3_b$—O—]$_n$—CO—R$^4$, $C_2$-$C_{20}$-alkenyl, $C_2$-$C_{18}$-acyl, $C_4$-$C_8$-cycloalkyl, where this may have OH substitution in the β-position, $C_6$-$C_{10}$-aryl, $C_7$-$C_{10}$-alkaryl or $C_7$-$C_{10}$-aralkyl, or, if x=1, $R^1$ and $R^2$ may also, together with the N, form a closed ring having from 4 to 10 members, composed of carbon atoms and, where appropriate, of up to 2 heteroatoms, or if x=2, $R^1$ may also be $C_2$-$C_{18}$-alkylene which, at both β-carbon atoms, may have OH substitution and/or have interruption by one or more O atoms and/or one or more $NR^2$ groups, or be dihydroxy-substituted tetrahydrodicyclopentadienylene, dihydroxy-substituted ethylcyclohexanylene, dihydroxy-substituted 4,4'-(bisphenol A dipropyl ether)ylene, isophoronylene, dimethylcyclohexanylene, dicyclohexylmethanylene or 3,3'-dimethyldicyclohexylmethanylene, and if x=3, $R^1$ may also be trihydroxy-substituted (tri-N-propyl isocyanurate)triyl;

$R^3_a$ and $R^3_b$=independently of one another $C_1$-$C_{22}$-alkyl, $C_2$-$C_6$-alkenyl, $C_6$-$C_{10}$-aryl, H or CH$_2$—X—R$^5$, where X=O, S, —O—CO— or —CO—O—;

$R^4$=$C_1$-$C_{18}$-alkyl/alkenyl or phenyl; and $R^5$=H, $C_1$-$C_{22}$-alkyl, $C_2$-$C_{22}$-alkenyl or $C_6$-$C_{10}$-aryl, and/or c) the salts of a) and b).

The invention also provides a process which uses stabilizer mixtures compatible with and/or soluble in the polymerization medium, encompassing at least a) a perchlorate salt and/or b) a reaction product of a mono- or polyfunctional epoxide and ammonia or, respectively, a mono- or polyfunctional dialkyl(aryl)- or mono-alkyl(aryl)amine and/or c) the salts of a) and b).

Examples of the alkanolamines of the general formula (I) are compounds where $R^1$ and $R^2$=methyl, ethyl, propyl, butyl, cyclohexyl, octyl, lauryl, tetradecyl, hexadecyl, stearyl, oleyl, allyl, phenyl or benzyl or hydroxyalkyl and $R^3$=H, methyl, ethyl, propyl or butyl. Preference is given to alkanolamines where $R^1$=lauryl, tetradecyl, hexadecyl, stearyl, or oleyl, where $R^2$=hydroxyalkyl. It is also possible to use ethoxylates and propoxylates of triethanol- and triisopropanolamine, and also of fatty amines of vegetable or animal origin. Preference is given to trialkanolamines and monoalkyl/alkenyldialkanolamines where $R^3$=H or methyl and y=1, in particular fatty amines which have been reacted twice with ethylene oxide or with propylene oxide.

Other compounds with very good suitability can be found in the following list.

Methyl- or dimethylamine reacted once or twice with ethylene oxide or with propylene oxide.

Propyl- or dipropylamine reacted once or twice with ethylene oxide or with propylene oxide.

Isopropyl- or diisopropylamine reacted once or twice with ethylene oxide or with propylene oxide.

Butyl- or dibutylamine reacted once or twice with ethylene oxide or with propylene oxide.

Isobutyl- or diisobutylamine reacted once or twice with ethylene oxide or with propylene oxide.

Pentyl- or dipentylamine reacted once or twice with ethylene oxide or with propylene oxide.

Isopentyl- or diisopentylamine reacted once or twice with ethylene oxide or with propylene oxide.

Hexyl- or dihexylamine reacted once or twice with ethylene oxide or with propylene oxide.

Isohexyl- or diisohexylamine reacted once or twice with ethylene oxide or with propylene oxide.

Heptyl- or diheptylamine reacted once or twice with ethylene oxide or with propylene oxide.

Isoheptyl- or diisoheptylamine reacted once or twice with ethylene oxide or with propylene oxide.

Octyl- or dioctylamine reacted once or twice with ethylene oxide or with propylene oxide.

Isooctyl- or diisooctylamine reacted once or twice with ethylene oxide or with propylene oxide.

Nonyl- or dinonylamine reacted once or twice with ethylene oxide or with propylene oxide.

Isononyl- or diisononylamine reacted once or twice with ethylene oxide or with propylene oxide.

Decyl- or didecylamine reacted once or twice with ethylene oxide or with propylene oxide.

Isodecyl- or diisodecylamine reacted once or twice with ethylene oxide or with propylene oxide.

Undecyl- or diundecylamine reacted once or twice with ethylene oxide or with propylene oxide.

Isoundecyl- or diisoundecylamine reacted once or twice with ethylene oxide or with propylene oxide.

Dodecyl- or didodecylamine reacted once or twice with ethylene oxide or with propylene oxide.

Isododecyl- or diisododecylamine reacted once or twice with ethylene oxide or with propylene oxide.

Tridecyl- or ditridecylamine reacted once or twice with ethylene oxide or with propylene oxide.

Isotridecyl- or diisotridecylamine reacted once or twice with ethylene oxide or with propylene oxide.

Tetradecyl- or ditetradecylamine reacted once or twice with ethylene oxide or with propylene oxide.

Hexadecyl- or dihexadecylamine reacted once or twice with ethylene oxide or with propylene oxide.

Octadecyl- or dioctadecylamine reacted once or twice with ethylene oxide or with propylene oxide.

Eicosyl- or dieicosylamine reacted once or twice with ethylene oxide or with propylene oxide.

Docosyl- or didocosylamine reacted once or twice with ethylene oxide or with propylene oxide.

N-Methylbutylamine reacted with ethylene oxide or with propylene oxide.

N-Ethylbutylamine reacted with ethylene oxide or with propylene oxide.

Allyl- or diallylamine reacted once or twice with ethylene oxide or with propylene oxide.

Crotyl- or dicrotylamine reacted once or twice with ethylene oxide or with propylene oxide.

Octadecenyl- or dioctadecenylamine reacted once or twice with ethylene oxide or with propylene oxide.

Benzyl- or dibenzylamine reacted once or twice with ethylene oxide or with propylene oxide.

Cyclohexyl- or dicyclohexylamine reacted once or twice with ethylene oxide or with propylene oxide.

N-Methylcyclohexylamine reacted with ethylene oxide or with propylene oxide.

N-Ethylcyclohexylamine reacted with ethylene oxide or with propylene oxide.

4-Vinyl-1-cyclohexene diepoxide reacted twice with diethanol- or diisopropanolamine.

Dicyclopentadiene diepoxide reacted twice with diethanol- or diisopropanolamine.

Bisphenol A diglycidyl ether reacted twice with diethanol- or diisopropanolamine.

Trisglycidyl isocyanurate reacted three times with diethanol- or diisopropanolamine.

Preference is given to trialkanolamines and monoalkyl/alkenyldialkanolamines and alkanolamines where $R^3{}_a$ and $R^3{}_b$=independently of one another H or methyl and y=1.

According to the invention it is also possible to use compounds of the general formula (I) where x=2, i.e. compounds which have two hydroxyalkylamino groups per molecule. Examples of these are N,N,N',N'-tetrakis(2-hydroxyethyl) ethylenediamine, N,N,N',N'-tetrakis(2-hydroxy-1-propyl) ethylenediamine, N,N,N',N'-tetrakis(2-hydroxyethyl)propylenediamine and N,N,N',N'-tetrakis(2-hydroxy-1-propyl) propylenediamine and N,N,N',N'-tetrakis(2-hydroxyethyl) hexamethylenediamine, preference being given to four-fold reactions of 1,6-hexamethylene- or 1,8-octamethylenediamine or neopentanediamine with ethylene oxide or with propylene oxide, or analogous reactions of bisaminomethylcyclohexane or isophoronediamine or 4,4'-diaminodicyclohexylmethane or 3,3'-dimethyl-4,4'-diaminodicyclohexylmethane.

According to the invention, it is also possible to use compounds of the general formula (I) where x=3, i.e. those which have three hydroxyalkylamino groups per molecule. An example of these is a reaction product of trisglycidyl isocyanurate with mono- or diethanolamine or mono- or dipropanolamine.

The alkanolamines of the general formula (I) are chemicals which can be purchased or can be prepared by known methods via N-alkylation of an appropriate amine or ammonia (cf. Kirk-Othmer, Vol. 2, Alkanolamines).

Examples of the preferred alkanolamines of the general formula (I) are tris(2-hydroxyethyl)amine, tris(2-hydroxy-1-propyl)amine, bis(2-hydroxyethyl)-2-hydroxy-1-propylamine, N-n-butyl-N,N-bis(2-hydroxyethyl)amine, N,N-bis(n-butyl)-N-(2-hydroxyethyl)amine, N-(3-n-butyloxy-2-hydroxy-1-propyl)-N,N-bis(2-hydroxy-ethyl)amine, N-(1,3-dihydroxy-2-hydroxymethyl-2-propyl)-N,N-bis(2-hydroxyethyl)amine, N,N-bis(2-hydroxyethyl)-N-palmitylamine, N,N-bis(2-hydroxyethyl)-N-oleylamine, N,N-bis(2-hydroxyethyl)-N-stearylamine, N,N-bis(2-hydroxyethyl)-N-stearylamine, N-(2-hydroxyethyl)morpholine and N-(2,3-dihydroxy-1-propyl)morpholine, bishydroxyethylpiperazine and bishydroxyisopropylpiperazine and reaction products of glycidyl ethers with mono- or dialkylamine or ammonia, and also the alkanolamines derived therefrom, for example ethanolamine, diethanolamine, mono- and di-n-propanolamine, and mono- and di-isopropanolamine.

Particular preference is also given to addition products of olefins oxides, such as butene oxide, butadiene oxide, hexene oxide, hexadiene oxide, octene oxide, octadiene oxide, decene oxide, dodecene oxide, tetradecene oxide, hexadecene oxide, octadecene oxide, eicosene oxide and docosene oxide, and also to epoxystearyl alcohol with diethanol- or diisopropanolamine, and also to other compounds with OH function in the β-position, for example N-(2-hydroxyhexadecyl)diethanolamine, N-(2-hydroxy-3-octyl(oxypropyl)diethanolamine, N-(2-hydroxy-3-decyloxypropyl) diethanolamine, N-(2-hydroxy-3-octyloxypropyl) diethanolamine and bis-N-(2-hydroxy-3-phenyloxypropyl) ethanolamine.

This list is given merely by way of example.

The perchlorates are known to the skilled worker. Examples are those of the formula $M(ClO_4)_n$, where M is H, Li, Na, K, Mg, Ca, Sr, Ba, Zn, Al, La, Ce or $NH_4$; n is 1, 2 or 3 as required by the valency of M. Aqueous ammonium perchlorate solutions or aqueous perchloric acid solutions may also be used in the use of the invention in an aqueous polymerization medium.

Various commonly used supply forms (formulations) of the perchlorates may be used here; for example as salt or solution in water or in an organic solvent. Other examples of these perchlorate formulations are perchlorates dissolved or complexed using alcohols (polyols, cyclodextrins) or using ether alcohols or ester alcohols or crown ethers. Other embodiments are described in EP 0 394 547, EP 0 457 471 and WO 94/24200.

It is preferable to use the salts sodium/potassium perchlorate.

The prestabilized polymer compositions prepared by these processes are likewise provided by the invention and feature intimate mixing, not previously achieved, of the halogen-containing polymer with the stabilizer system before they have undergone any thermal stress. The first step hitherto needed of incorporation of the stabilizer mixture is thus omitted, while the polymer prepared is directly ready for use. The distribution of the stabilizer mixture in the polymer here is almost homogeneous. The polymer compositions of the invention include dispersions of the prestabilized polymers and the prestabilized polymers in dry form.

It is advantageous to use from 0 to 8 parts by weight, preferably from 0.05 to 5 parts by weight, in particular from 0.1 to 2 parts by weight, of the compounds of the general formula (I) listed under (b), based on 100 parts by weight of PVC, to achieve stabilization in the chlorine-containing polymer in these compositions. The amount used of the perchlorates listed under (a) may be from 0.01 to 3 parts by weight, particularly preferably from 0.01 to 2 parts by weight, based on 100 parts by weight of PVC. Finally, use may be made of amounts of from 0.01 to 5 parts by weight, preferably from 0.1 to 2 parts by weight, of the salts of a) and b) listed under c).

The invention also provides a process for preparing ready-to-use polymer mixtures (compounded materials) in which, after the prestabilization of the invention, subsequent additional stabilization of the polymer takes place using conventional stabilizers and/or additives. The result is ready-to-use polymer mixtures in which further stabilizers and/or additives were added to a previously heat-stabilized, prestabilized polymer. These polymer mixtures, which are also included within the invention, feature optimized thermal and optical properties, an example being that the prestabilization has a favourable effect on the starting colour when the initial thermal stress occurs.

Examples of stabilizers and/or additives which can be used in the post-stabilization process are phosphites, polyols and disaccharide alcohols, glycidyl compounds, hydrotalcites, zeolites (aluminosilicates of alkali metals or of alkaline earth metals), fillers, metal soaps, other compounds of alkali metals or of alkaline earth metals, fillers/pigments, lubricants, plasticizers, pigments, epoxidized fatty esters, and other epoxy compounds, antioxidants, UV absorbers, light stabilizers, optical brighteners, wetting agents, antisettling agents and blowing agents. Examples of these additional components are listed and illustrated below (cf. "Handbook of PVC-Formulating" by E. J. Wickson, John Wiley & Sons, New York 1993).

Polyols and Disaccharide Alcohols

Examples of possible compounds of this type are:

pentaerythritol, dipentaerythritol, tripentaerythritol, trimethylolethane, bis(trimethylolpropane), polyvinyl alcohol, bis(trimethylolethane), trimethylolpropane, sugars, sugar alcohols. Of these, preference is given to the disaccharide alcohols.

It is also possible to use polyol syrups, such as sorbitol syrup, mannitol syrup and maltitol syrup.

Examples of the amounts of the polyols used are from 0.01 to 20 parts by weight, advantageously from 0.1 to 20 parts by weight and in particular from 0.1 to 10 parts by weight, based on 100 parts by weight of PVC.

Glycidyl Compounds

These contain the glycidyl group

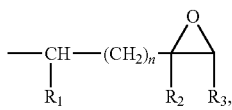

bonded directly to carbon, oxygen, nitrogen or sulphur atoms, either where both of $R_1$ and $R_3$ are hydrogen, $R_2$ is hydrogen or methyl and n=0 or where $R_1$ and $R_3$ together are —$CH_2$—$CH_2$— or —$CH_2$—$CH_2$—$CH_2$—, $R_2$ then being hydrogen and n being 0 or 1.

It is preferable to use glycidyl compounds having two functional groups. However, it is also possible in principle to use glycidyl compounds having one, three or more functional groups.

Use is predominantly made of diglycidyl compounds having aromatic groups.

The amounts used of the terminal epoxy compounds are preferably at least 0.1 part, preferably from 0.1 to 50 parts by weight, advantageously from 1 to 30 parts by weight and in particular from 1 to 25 parts by weight, based on 100 parts by weight of PVC.

Hydrotalcites

The chemical composition of these compounds is known to the skilled worker, e.g. from the patents DE 3 843 581, U.S. Pat. No. 4,000,100, EP 0 062 813 and WO 93/20135.

Compounds from the hydrotalcite series may be described by the following general formula

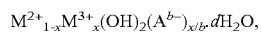

where $M^{2+}$=one or more of the metals selected from the group consisting of Mg, Ca, Sr, Zn and Sn, $M^{3+}$=Al or B, $A^n$ an anion of valency n, b is a number from 1 to 2, 0<x<0.5, d is a number from 0 to 20.

Preference is given to compounds with $A^n$=$OH^-$, $ClO_4^-$, $HCO_3^-$, $CH_3COO^-$, $C_6H_5COO^-$, $CO_3^{2-}$, $(CHOHCOO)_2^{2-}$, $(CH_2COO)_2^{2-}$, $CH_3CHOHCOO^-$, $HPO_3^-$ or $HPO_4^{2-}$.

Examples of hydrotalcites are $Al_2O_3.6MgO.CO_2.12H_2O$ (i), $Mg_{4.5}Al_2(OH)_{13}.CO_3.3.5H_2O$ (ii), $4MgO.Al_2O_3.CO_2.9H_2O$ (iii), $4MgO.Al_2O_3.CO_2.6H_2O$, $ZnO.3MgO.Al_2O_3.CO_2.8-9H_2O$ and $ZnO.3MgO.Al_2O_3.CO_2.5-6H_2O$.

Very particular preference is given to the types Alkamizer 2, Alkamizer P 93-2 (ex Kyowa) and L-CAM (lithium-modified hydrotalcite ex Fuji). It is preferable to use dehydrated hydrotalcites.

Zeolites (Aluminosilicates of Alkali Metals and/or of Alkaline Earth Metals)

These may be described by the following general formula $M_{x/n}[(AlO_2)_x(SiO_2)_y].wH_2O$, where n is the charge on the cation M;

M is an element of the first or second main group, such as Li, Na, K, Mg, Ca, Sr or Ba;

y: x is a number from 0.8 to 15, preferably from 0.8 to 1.2; and w is a number from 0 to 300, preferably from 0.5 to 30.

Examples of zeolites are sodium aluminosilicates of the formulae

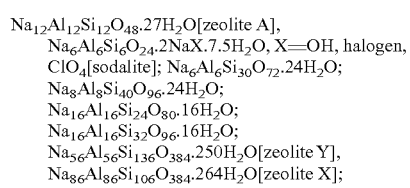

or the zeolites which can be prepared by partial or complete exchange of the Na atoms by Li atoms, K atoms, Mg atoms, Ca atoms, Sr atoms or Zn atoms, for example

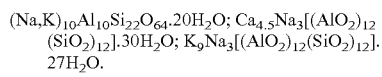

$(Na,K)_{10}Al_{10}Si_{22}O_{64} \cdot 20H_2O; Ca_{4.5}Na_3[(AlO_2)_{12}(SiO_2)_{12}] \cdot 30H_2O; K_9Na_3[(AlO_2)_{12}(SiO_2)_{12}] \cdot 27H_2O.$ Very particular preference is given to Na zeolite A and Na zeolite P.

The hydrotalcites and/or zeolites may be used in amounts of, for example, 0.1 to 20 parts by weight, expediently 0.1 to 10 parts by weight and in particular 0.1 to 5 parts by weight, based on 100 parts by weight of halogen-containing polymers.

Fillers

Fillers such as calcium carbonate, dolomite, wollastonite, magnesium oxide, magnesium hydroxide, silicates, china clay, talc, glass fibres, glass beads, wood flour, mica, metal oxides or metal hydroxides, carbon black, graphite, rock flour, heavy spar, glass fibres, talc, kaolin and chalk are used. Preference is given to chalk (HANDBOOK OF PVC FORMULATING E. J. Wickson, John Wiley & Sons, Inc., 1993, pp. 393-449) and reinforcing agents (TASCHENBUCH der Kunststoffadditive [Plastics Additives Handbook], R. Gächter & H. Müller, Carl Hanser, 1990, pp. 549-615).

The fillers may be used in amounts of preferably at least one part by weight, for example 5 to 200 parts by weight, expediently 5 to 150 parts by weight and in particular from 5 to 100 parts by weight, based on 100 parts by weight of PVC.

Metal Soaps

Metal soaps are primarily metal carboxylates, preferably of relatively long-chain carboxylic acids. Well-known examples of these are stearates and laurates, and also oleates and salts of relatively short-chain aliphatic or aromatic carboxylic acids, such as acetic acid, propionic acid, butyric acid, valeric acid, hexanoic acid, sorbic acid; oxalic acid, malonic acid, succinic acid, glutaric acid, adipic acid, fumaric acid, citric acid, benzoic acid, salicylic acid, phthalic acids, hemimellitic acid, trimellitic acid, pyromellitic acid.

Metals which should be mentioned are: Li, Na, K, Mg, Ca, Sr, Ba, Zn, Al, La, Ce and rare earth metals. Use is frequently made of so-called synergistic mixtures, such as barium/zinc stabilizers, magnesium/zinc stabilizers, calcium/zinc stabilizers or calcium/magnesium/zinc stabilizers. The metal soaps may be used either alone or in mixtures. An overview of common metal soaps is found in Ullmann's Encyclopedia of Industrial Chemistry, 5th Ed., Vol. A16 (1985), pp. 361 et seq.

The metal soaps or mixtures of these may be used in amounts of, for example, 0.001 to 10 parts by weight, expediently 0.01 to 8 parts by weight, particularly preferably 0.05 to 5 parts by weight, based on 100 parts by weight of PVC.

Alkali Metal and Alkaline Earth Metal Compounds

For the purposes of the present invention, these are mainly the carboxylates of the acids described above, but also corresponding oxides or, respectively, hydroxides or carbonates. Mixtures of these with organic acids are also possible. Examples are LiOH, NaOH, KOH, CaO, Ca(OH)$_2$, MgO, Mg(OH)$_2$, Sr(OH)$_2$, Al(OH)$_3$, CaCO$_3$ and MgCO$_3$ (and also basic carbonates, such as magnesia alba and huntite), and also fatty-acid salts of Na and of K. In the case of alkaline earth carboxylates and Zn carboxylates it is also possible to use adducts of these with MO or M(OH)$_2$ (M=Ca, Mg, Sr or Zn), so-called "overbased" compounds. In addition to the stabilizers according to the invention it is preferable to use alkali metal carboxylates, alkaline earth metal carboxylates and/or aluminium carboxylates.

Lubricants

Examples of possible lubricants are: montan wax, fatty esters, PE waxes, amide waxes, chloroparaffins, glycerol esters and alkaline earth metal soaps, and fatty ketones, and also the lubricants, or combinations of the lubricants, listed in EP 0 259 783. Calcium stearate is preferred.

Plasticizers

Examples of organic plasticizers are those from the following groups:

A) Phthalates: such as preferably di-2-ethylhexyl, diisononyl and diisodecyl phthalate, also known by the common abbreviations DOP (dioctyl phthalate, di-2-ethylhexylphthalate), DINP (diisononyl phthalate), DIDP (diisodecyl phthalate).

B) Esters of aliphatic dicarboxylic acids, in particular esters of adipic, azelaic, and sebacic acid: preferably di-2-ethylhexyl adipate and diisooctyl adipate.

C) Trimellitic esters, such as tri-2-ethylhexyl trimellitate, triisodecyl trimellitate (mixture), triisotridecyl trimellitate, triisooctyl trimellitate (mixture), and also tri-$C_6$-$C_8$-alkyl, tri-$C_6$-$C_{10}$-alkyl, tri-$C_7$-$C_9$-alkyl and tri-$C_9$-$C_{11}$-alkyl trimellitate. Common abbreviations are TOTM (trioctyl trimellitate, tri-2-ethylhexyl trimellitate), TIDTM (triisodecyl trimellitate) and TITDTM (triisotridecyl trimellitate).

D) Epoxy plasticizers: these are primarily epoxidized unsaturated fatty acids, e.g. epoxidized soybean oil.

E) Polymeric plasticizers: the commonest starting materials for preparing polyester plasticizers are: dicarboxylic acids, such as adipic, phthalic, azelaic or sebacic acid; diols, such as 1,2-propanediol, 1,3-butanediol, 1,4-butanediol, 1,6-hexanediol, neopentyl glycol and diethylene glycol.

F) Phosphoric esters: a definition of these esters is given in the abovementioned "Taschenbuch der Kunststoffadditive" ["Plastics Additives Handbook"], Chapter 5.9.5, pp. 408-412. Examples of these phosphoric esters are tributyl phosphate, tri-2-ethylbutyl phosphate, tri-2-ethylhexyl phosphate, trichloroethyl phosphate, 2-ethylhexyl diphenyl phosphate, cresyl diphenyl phosphate, triphenyl phosphate, tricresyl phosphate and trixylenyl phosphate. Preference is given to tris(2-ethylhexyl) phosphate and Reofos® 50 and 95 (Ciba Spezialitätenchemie).

G) Chlorinated hydrocarbons (paraffins)

H) Hydrocarbons

I) Monoesters, e.g. butyl oleate, phenoxyethyl oleate, tetrahydrofurfuryl oleate and alkylsulphonates.

J) Glycol esters, e.g. diglycol benzoates.

A definition of these plasticizers and examples for the same are given in "Kunststoffadditive" ["Plastics Additives"], R. Gächter/H. Müller, Carl Hanser Verlag, 3rd Ed., 1989, Chapter 5.9.6, pp. 412-415, and in "PVC Technology", W. V. Titow, 4th Ed., Elsevier Publ., 1984, pp. 165-170. It is also possible to use mixtures of different plasticizers. The plasticizers may be used in amounts of, for example, 5 to 20 parts by weight, expediently 10 to 20 parts by weight, based on 100 parts by weight of PVC. Rigid or semirigid PVC preferably comprises up to 10%, particularly preferably up to 5%, of plasticizer, or no plasticizer.

Pigments

Suitable substances are known to the skilled worker. Examples of inorganic pigments are TiO$_2$, pigments based on zirconium oxide, BaSO$_4$, zinc oxide (zinc white) and lithopones (zinc sulphide/barium sulphate), carbon black, carbon black-titanium dioxide mixtures, iron oxide pigments, Sb$_2$O$_3$, (Ti,Ba,Sb)O$_2$, Cr$_2$O$_3$, spinels, such as cobalt blue and cobalt green, Cd(S,Se), ultramarine blue. Examples of organic pigments are azo pigments, phthalocyanine pigments, quinacridone pigments, perylene pigments, diketopyrrolopyrrole pigments and anthraquinone pigments. $TiO_2$ in micronized form is also preferred. A definition and further descriptions are found in the "Handbook of PVC Formulating", E. J. Wickson, John Wiley & Sons, New York, 1993.

Phosphites

Organic phosphites are known costabilizers for chlorine-containing polymers. Examples of these are trioctyl, tridecyl, tridodecyl, tritridecyl, tripentadecyl, trioleyl, tristearyl, triphenyl, trilauryl, tricresyl, tris(nonylphenyl), tris(2,4-tert-butylphenyl) and tricyclohexyl phosphite.

Other suitable phosphites are various mixed aryl dialkyl or alkyl diarylphosphites, such as phenyl dioctyl, phenyl didecyl, phenyl didodecyl, phenyl ditridecyl, phenyl ditetradecyl, phenyl dipentadecyl, octyl diphenyl, decyl diphenyl, undecyl diphenyl, dodecyl diphenyl, tridecyl diphenyl, tetradecyl diphenyl, pentadecyl diphenyl, oleyl diphenyl, stearyl diphenyl and dodecyl bis(2,4-di-tert-butylphenyl) phosphite.

Advantageous use may also be made of phosphites of various di- or polyols: e.g. tetraphenyldipropylene glycol diphosphite, poly(dipropylene glycol) phenyl phosphite, tetraisodecyl dipropylene glycol diphosphite, tris(dipropylene glycol) phosphite, tetramethylolcyclohexanol decyl diphosphite, tetramethylolcyclohexanol butoxyethoxyethyl diphosphite, tetramethylolcyclohexanol nonylphenyl diphosphite, bis(nonylphenyl) di(trimethylolpropane) diphosphite, bis(2-butoxyethyl) di(trimethylolpropane) diphosphite, tris(hydroxyethyl) isocyanurate hexadecyl triphosphite, didecyl pentaerythrityl diphosphite, distearyl pentaerythrityl diphosphite, bis(2,4-di-tert-butylphenyl) pentaerythrityl diphosphite, and also mixtures of these phosphites and aryl/alkyl phosphite mixtures of empirical composition $(H_{19}C_9\text{-}C_6H_4O)_{1.5}P(OC_{12,13}H_{25,27})_{1.5}$ or $[C_8H_{17}\text{—}C_6H_4\text{—}O\text{—}]_2P[i\text{-}C_8H_{17}O]$, $(H_{19}C_9\text{-}C_6H_4O)_{1.5}P(OC_{9,11}H_{19,23})_{1.5}$.

Examples of the amounts of the organic phosphites used are from 0.01 to 10 parts by weight, advantageously from 0.05 to 5 parts by weight and in particular from 0.1 to 3 parts by weight, based on 100 parts by weight of PVC.

Epoxidized Fatty Acid Esters and Other Epoxy Compounds

The stabilizer combination of the invention may additionally and preferably comprise at least one epoxidized fatty acid ester. Possible compounds here are especially esters of fatty acids from natural sources (fatty acid glycerides), such as soya oil or rapeseed oil. However, it is also possible to use synthetic products, such as epoxidized butyl oleate. Use may also be made of epoxidized polybutadiene and polyisoprene, if desired also in a partially hydroxylated form, or of glycidyl acrylate and glycidyl methacrylate as homo- or copolymer. These epoxy compounds may also have been applied to an alumino salt compound; in this connection see also DE-A-4 031 818.

Antioxidants

Alkylated monophenols, e.g. 2,6-di-tert-butyl-4-methylphenol, alkylthiomethylphenols, e.g. 2,4-dioctylthiomethyl-6-tert-butylphenol, alkylated hydroquinones, e.g. 2,6-di-tert-butyl-4-methoxyphenol, hydroxylated thiodiphenyl ethers, e.g. 2,2'-thiobis(6-tert-butyl-4-methylphenol), alkylidenebisphenols, e.g. 2,2'-methylenebis(6-tert-butyl-4-methylphenol), benzyl compounds, e.g. 3,5,3',5'-tetratert-butyl-4,4'-dihydroxydibenzyl ether, hydroxybenzylated malonates, e.g. dioctadecyl 2,2-bis(3,5-di-tert-butyl-2-hydroxybenzyl) malonate, hydroxybenzyl aromatics, e.g. 1,3,5-tris(3,5-di-tert-butyl-4-hydroxybenzyl)-2,4,6-trimethylbenzene, triazine compounds, e.g. 2,4-bis-octylmercapto-6-(3,5-di-tert-butyl-4-hydroxyanilino)-1,3,5-triazine, phosphonates and phosphonites, e.g. dimethyl 2,5-di-tert-butyl-4-hydroxybenzylphosphonate, acylaminophenols, e.g. 4-hydroxylauranilide, esters of beta-(3,5-ditert-butyl-4-hydroxyphenyl)propionic acid, beta-(5-tert-butyl-4-hydroxy-3-methylphenyl)propionic acid, beta-(3,5-dicyclohexyl-4-hydroxyphenyl)propionic acid, esters of 3,5-ditert-butyl-4-hydroxyphenylacetic acid with mono- or polyhydric alcohols, amides of beta-(3,5-ditert-butyl-4-hydroxyphenyl) propionic acid, for example, N,N'-bis(3,5-ditert-butyl-4-hydroxyphenylpropionyl)hexamethylenediamine, vitamin E (tocopherol) and derivatives.

Examples of the amounts of the antioxidants used are from 0.01 to 10 parts by weight, advantageously from 0.1 to 10 parts by weight and in particular from 0.1 to 5 parts by weight, based on 100 parts by weight of PVC.

UV Absorbers and Light Stabilizers

Examples of these are: 2-(2'-hydroxyphenyl)benzotriazoles, such as 2-(2'-hydroxy-5'-methylphenyl)benzotriazole, 2-hydroxybenzophenones, esters of unsubstituted or substituted benzoic acids, such as 4-tert-butylphenyl salicylate, phenyl salicylate, acrylates, nickel compounds, oxalamides, such as 4,4'-dioctyloxyoxanilide, 2,2'-dioctyloxy-5,5'-ditert-butyloxanilide, 2-(2-hydroxyphenyl)-1,3,5-triazines, such as 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, sterically hindered amines, such as bis(2,2,6,6-tetramethylpiperidin-4-yl) sebacate, bis(2,2,6,6-tetramethylpiperidin-4-yl) succinate.

Blowing Agents

Examples of blowing agents are organic azo compounds and organic hydrazo compounds, tetrazoles, oxazines, isatoic anhydride, and also soda and sodium bicarbonate. Preference is given to azodicarbonamide and sodium bicarbonate and also mixtures of these.

Definitions for and examples of impact modifiers and processing aids, gelling agents, antistats, biocides, metal deactivators, optical brighteners, flame retardants, antifogging agents and compatibilizers are given in "Kunststoffadditive" ["Plastics Additives"], R. Gächter/H. Müller, Carl Hanser Verlag, 3rd Ed., 1989, and 4th Ed. 2001, and in "Handbook of Polyvinyl Chloride Formulating" E. J. Wilson, J. Wiley & Sons, 1993, and also in "Plastics Additives" G. Pritchard, Chapman & Hall, London, 1st edition, 1998.

Impact modifiers are also described in detail in "Impact Modifiers for PVC", J. T. Lutz/D. L. Dunkelberger, John Wiley & Sons, 1992.

Examples of the prestabilized chlorine-containing polymers to be prepared are:

polymers of vinyl chloride, of vinylidene chloride, vinyl resins whose structure contains vinyl chloride units, for example copolymers of vinyl chloride and vinyl esters of aliphatic acids, in particular vinyl acetate, copolymers of vinyl chloride with esters of (meth)acrylic acid and with acrylonitrile, copolymers of vinyl chloride with diene compounds and with unsaturated dicarboxylic acids or anhydrides of these, for example copolymers of vinyl chloride with diethyl maleate, diethyl fumarate, or maleic anhydride, post-chlorinated polymers and copolymers of vinyl chloride, copolymers of vinyl chloride and of vinylidene chloride with unsaturated aldehydes, ketones and other compounds, for example acrolein, crotonaldehyde, vinyl methyl ketone, vinyl methyl ether, vinyl isobutyl ether, and the like; polymers of vinylidene chloride and copolymers of the same with vinyl chloride and with other polymerizable compounds; polymers of vinyl chloroacetate and of dichlorodivinyl ether; chlorinated polymers of vinyl acetate, chlorinated polymeric esters of acrylic acid and of alpha-substituted acrylic acid; polymers of chlorinated styrenes, such as dichlorostyrene; chlorinated rubbers; chlorinated polymers of ethylene; polymers and post-chlorinated polymers of chlorobutadiene and copolymers of these with vinyl chloride, chlorinated natural and synthetic rubbers, and mixtures of the polymers mentioned with each other or with other polymerizable compounds. For the purposes of this invention, PVC includes copolymers with polymerizable compounds, such as acrylonitrile, vinyl acetate, or ABS, and the materials may involve suspension, bulk or emulsion polymers.

Preference is given to a PVC homopolymer or a PVC homopolymer combined with polyacrylates.

Use may also be made of graft polymers of PVC with EVA, ABS and MBS. Other preferred substrates are mixtures of the abovementioned homo- and copolymers, in particular vinyl chloride homopolymers, with other thermoplastic and/or elastomeric polymers, in particular blends with ABS, MBS, NBR, SAN, EVA, CPE, MBAS, PMA, PMMA, EPDM and with polylactones, in particular those from the group ABS, NBR, NAR, SAN and EVA. The abbreviations used for the copolymers are familiar to the skilled worker and have the following meaning: ABS: acrylonitrile-butadiene-styrene; SAN: styrene-acrylonitrile; NBR: acrylonitrile-butadiene; NAR: acrylonitrile-acrylate; EVA: ethylene-vinyl acetate. Other particular materials which may be used are acrylate-based styrene-acrylonitrile copolymers (ASA).

Polymer compositions which comprise a mixture of from 25 to 75% by weight of PVC and 75 to 25% by weight of the copolymers mentioned as components (i) and (ii) are preferred here. Compositions composed of (i) 100 parts by weight of PVC and (ii) from 0 to 300 parts by weight of ABS and/or SAN-modified ABS and from 0 to 80 parts by weight of the copolymers NBR, NAR and/or EVA, PMA, PMMA, but in particular EVA, PMA and PMMA, are a particularly important component.

The compounds which may be used concomitantly according to the invention, and also the chlorine-containing polymers, are well known to the skilled worker and are described in detail in "Kunstoffadditive" [Plastics additives], R. Gächter/H. Müller, Carl Hanser Verlag, 3rd and 4th edn., 1989 and 2001; and in DE 197 41 778 and EP-A 99 105 418.0 of Mar. 17, 1999, expressly incorporated herein by way of reference.

The monomers are polymerized by traditional emulsion or suspension polymerization. More details on the polymerization process can be found in DE 1 269 350 or EP 0 281 201. The commonly used polymerization initiators are mostly peroxidic or azo compounds used as free-radical initiators. Examples of these are: persulphates, organic and inorganic peroxide salts, hydrogen peroxide, percarbonates and peresters, benzoyl peroxide, ketone peroxides, polyester peroxides, polyether peroxides, cyclohexanone peroxide, methyl ethyl ketone peroxide, cumyl hydroperoxide, diacyl peroxides, and tert-butyl hydroperoxides. The prestabilization of the invention can be used with any of the industrially relevant processes for polymerization of halogen-containing monomers.

The stabilizer system is added to or dissolved in the polymerization medium by the usual laboratory methods, directly in the form of a solid or mixture of solids, or in the form of a solution or dispersion in a suspension medium or, respectively, solvent compatible with the polymerization medium. The addition may take place prior to, during, or after the polymerization.

The following methods may be used to incorporate the stabilizers and/or additives into the prestabilized polymers: an emulsion or dispersion method (one example being the use of a mixture which is a paste); a dry mixture method during the mixing of additional components; a method with direct addition to the process apparatus (e.g. calender, mixer, kneader, extruder or the like) or a method involving a solution or melt or what are known as flakes or pellets in dust-free or one-pack form.

The ready-to-use polymer mixtures comprising all of the additives, known as compounded polymer materials, may be prepared in a manner known per se, and to this end use is made of apparatus known per se, such as the abovementioned process apparatus, to mix further stabilizers and/or additives with the prestabilized PVC. These stabilizers or additives may be added individually or in a mixture, or else in the form of what are known as masterbatches.

The ready-to-use PVC prepared by the present invention may be brought to the desired form by known methods. Examples of these processes are milling, calendering, extruding, injection moulding and spinning, and extrusion with blowing. The stabilized PVC may also be processed to give foams.

Examples of uses for which a ready-to-use PVC prepared by the present invention is particularly suitable are hollow articles (bottles), packaging films (thermoforming films), blown films, pipes, foams, heavy profiles (window frames), thin-wall profiles, construction profiles, films (including Luvitherm), PVC pipes, profiles, sidings, fittings, office sheeting and apparatus housings (computers, household devices). The PVC of the invention is particularly suitable for semirigid and flexible formulations, in particular in the form of flexible formulations for cable sheathing, cable insulation, floorcoverings, wallpapers, motor vehicle components, flexible films, injection mouldings, and hoses, these being particularly preferred. In the form of semirigid formulations the PVC of the invention is particularly suitable for decorative films, foams, agricultural sheeting, hoses, sealing profiles and office sheeting.

Examples of the application of the PVC of the invention as a plastisol are synthetic leather, floorcoverings, textile coatings, wallpapers, coil coatings and underbody protection for motor vehicles.

Examples of sintered PVC applications of the stabilized ready-to-use PVC of the invention are slush, slush-mould and coil coatings for plastisol formulations, semirigid formulations and flexible formulations.

For more details in this connection see "Kunststoffhandbuch PVC" [Plastics Handbook PVC], volume 2/2, W. Becker/H. Braun, 2nd edn., 1985, Carl Hanser Verlag, pages 1236-1277.

The examples below illustrate the invention but do not limit the same. As in the remainder of the Description, parts and percentage data are based on weight.

EXAMPLES

TABLE 1

Stabilizers used

| Stabilizer | Name |
|---|---|
| 1 | Triethanolamine + 13% sodium perchlorate monohydrate |
| 2 | Triethanolamine |
| 3 | Sodium perchlorate monohydrate |
| 4 | Oleyldiethanolamine + 13% sodium perchlorate monohydrate |
| 5 | Oleyldiethanolamine |
| 6 | Triisopropanolamine + 13% sodium perchlorate monohydrate |

TABLE 1-continued

Stabilizers used

| Stabilizer | Name |
|---|---|
| 7 | Triisopropanolamine |
| 8 | Tri-n-octylamine |
| 9 | Sodium carbonate |
| 10 | Diphenylurea |

Example 1

Preparation of Prestabilized PVC Powder

A suspension PVC(SPVC) was prepared in a 500 ml stainless steel autoclave from monomeric vinyl chloride (VCM) by free-radical polymerization. The process parameters were retained for all of the experiments:

temperature: 57.2° C.

stirring rate: 1 800 rpm suspension medium: 2% Methocel F-50 (hydroxypropylmethylcellulose in water, NOXOL (polyvinyl alcohol) as anticaking agent)

reaction time: about 210 min conversion rate: about 80%.

Two different initiator systems were used for the free-radical polymerization.

Experimental series 1: Esperox 939 M (75% strength solution of cumyl peroxyneodecanoate)

Experimental series 2: Espercarb S 840 M (75% strength solution of di-2-ethylhexyl peroxydicarbonate)

(both being commercially available initiators from Crompton for free-radical polymerization processes).

As shown in Table 2 the initiators were used at 0.1 or 0.12% by weight, based on VCM.

The stabilizers listed in Table 1—in each case 0.5% by weight, based on VCM—were added at various times, either at the start of the polymerization or once conversion had reached about 80% (at the "end of the reaction").

Once the polymerization process had ended, the solid polymer was filtered off, washed and dried to give a fine white powder, which was tested for thermal stability (DHC, statistical heat test) and processability (pasting+film production).

Thermal Stabilization Test/Dehydrochlorination Test

The PVC powder prepared in this way was subjected to a dehydrochlorination test (DHC) to DIN 53381 at 180° C. (see Table 2.0).

Statistical Heat Test 45 g of the "PVC powder" were roll-milled with 15 g of diisononyl phthalate (DINP), 0.1 g of calcium stearate and 0.15 g of Loxiol G 71 S (pentaerythrityl adipate=complex ester lubricant) for 3 minutes at 180° C. Test strips of thickness 0.5 mm were taken from the resultant PVC sheet and the colour was then determined via Yellowness Index (YI) to ASTM D1925-70 (see Tab. 2.0 and Tab. 2.1).

TABLE 2.0

| PVC powder | Initiator | Stab. | DHC Of powder 10 [µS/cm] | 200 [µS/cm] | Colour (YI value)* of sheet |
|---|---|---|---|---|---|
| 1) | Esperox 939 M 0.10% by weight | — | 14 | 35 | 27.39 |
| 5) | Espercarb S 840 M 0.12% by weight | — | 8 | 27 | 21.87 |
| 9) | Esperox 939 M 0.10% by weight | 1② | 17 | 42 | 15.44 |
| 11) | Espercarb S 840 M 0.12% by weight | 1② | 30 | 51 | 18.32 |
| 15) | Esperox 939 M 0.10% by weight | 4① | 21 | 53 | 14.64 |

*high values mean poor starting colour
① Addition at start of polymerization
② Addition at end of polymerization Experiments 9, 11 and 15 (according to the invention) show the marked superiority in terms of thermal stability (longer induction times at 10 and 200 µS/cm) and the better starting colour of the sheets produced (YI values).

TABLE 2.1

| PVC powder | Description | Stab. | Discoloration without post-stabilization (YI value)* | | Discoloration with post-stabilization** (YI value)* | |
|---|---|---|---|---|---|---|
| | | | 5 min | 30 min | 5 min | 30 min |
| Ref. | Evipol SH 7020 from EVC *** | Without prestab. | 16 | 47 | 7 | 15 |
| 15) | Esperox 939 initiator 0.1% by weight | 4① | 6 | 28 | 5 | 7 |
| 13) | Esperox 939 initiator 0.1% by weight | 1② | 8 | 40 | 5 | 7 |

*high values mean poor starting colour
**Mark BZ 561 Ba/Zn stabilizer from Crompton Vinyl Additives GmbH
***conventional SPVC from EVC (without prestabilization)
① Addition at start of polymerization
② Addition at end of polymerization It is clear that prestabilized PVC grades show marked advantages when use is made of conventional post-stabilization systems, and have markedly improved thermal stability even without post-stabilization.

Example 2

Preparation of PVC Powder 3

A mixture made from 50 g of an aqueous dispersion composed of about 50% of solid PVC and 50% of water with additives such as 4-alkylbenzenesulphonic acid derivative/antiblocking agent/polymerization auxiliary and 0.125 g of a stabilizer as described in Table 1 was stirred at 80° C. for 60 minutes. This mixture was then dried in a crystallization dish at about 20° C. (powder 3).

Dehydrochlorination Test

The PVC powders thus prepared were then subjected to a dehydrochlorination test (DHC) to DIN 53381 at 180° C. The results are seen in Table 3.

TABLE 3

| Stabilizer | DHC 10 [μS/cm] min |
|---|---|
| Without stabilizer | 14 |
| 1 | 50 |
| 2 | 44 |
| 3 | 10 |
| 4 | 35 |
| 5 | 25 |
| 6 | 38 |
| 7 | 28 |
| 8 | 16 |
| 10 | 15 |

Each of the stabilizer mixtures which may be used according to the invention shows a marked advantage over the individual components or absence of stabilizers, this being apparent from the longer induction times (10 [μS/cm]min).

Example 3

20 g of "powder (3)" PVC powder were processed with 20 g of dioctyl phthalate (DOP) in a dissolver to give a PVC paste and gelled in a Mathis oven at 190° C. to give a sheet of thickness 0.5 mm.

Statistical Heat Test

The Yellowness Index (YI) of this sheet was then determined to ASTM D1925-70 (Table 4). Low YI values mean good stabilization and starting colour.

TABLE 4

| Stabilizer | YI value of sheet |
|---|---|
| Without stabilizer | 11.65 |
| 1 | 6.05 |
| 2 | 6.98 |
| 3 | 8.77 |
| 4 | 6.56 |
| 5 | 8.30 |
| 6 | 6.02 |
| 7 | 8.26 |
| 8 | 9.07 |
| 9 | 8.43 |
| 10 | 17.22 |

Each of the mixtures 1, 4 and 6 of the invention shows an improved starting colour (lower YI value) when compared with the reference 10 known from the literature or with the unstabilized sheet.

Example 4

Preparation of PVC Powder 4

A mixture made from 50 g of an aqueous PVC dispersion composed of about 40% of solid PVC and 60% of water with additions of sorbitan ester, polymerization auxiliaries, emulsifiers and 0.125 g of a stabilizer as described in Table 1 was stirred at 80° C. for 60 minutes. This mixture was then dried in a crystallization dish at about 20° C. (PVC powder 4).

Dehydrochlorination Test

The PVC powder thus prepared was then subjected to a dehydrochlorination test (DHC) to DIN 53381 at 180° C. (Table 5).

TABLE 5

| | DHC | |
|---|---|---|
| Stabilizer | 10 [μS/cm] min | 200 [μS/cm] min |
| Without stabilizer | 40 | 51 |
| 1 | 62 | 78 |
| 2 | 32 | 38 |
| 3 | 35 | 47 |
| 8 | 19 | 26 |
| 9 | 43 | 49 |
| 10 | 55 | 69 |

It is clearly apparent that, as previously described in Examples 1 and 3, the stabilizer mixture 1 of the invention is more effective than the individual components and the stabilizers 9+10 described in the literature, this being apparent from the longer induction times (10 and 200 [μS/cm]min).

Example 5

20 g of "powder (4)" PVC powder prepared as in Example 4 were processed with 20 g of dioctyl phthalate in a dissolver to give a PVC paste and gelled in a Mathis oven at 190° C. to give a sheet of thickness 0.5 mm. Test strips of thickness 0.5 mm were taken from this sheet and heated at 180° C. in the Mathis oven, and the Yellowness Index (YI) to ASTM D1925-70 was determined at intervals of 2 minutes.

TABLE 6

| | Statistical heat test | | |
|---|---|---|---|
| | YI value after | | |
| Stabilizer | 2 min | 10 min | 24 min |
| Without stabilizer | 8.02 | 16.30 | Terminated |
| 1 | 6.69 | 10.76 | 23.57 |
| 2* | 7.87 | 28.56 | Terminated |

*pure amine has a "degrading" action, as described in the literature

As in Examples 2 and 3, it is again clear that PVC compositions which have been prepared by the process of the invention have high stability.

The invention claimed is:

1. A process for preparing a stabilized suspension/emulsion PVC polymer comprising
  (1) adding a polymer thermal stabilizer mixture compatible with the polymerization medium prior to, during or directly after the polymerization, prior to the isolation of the polymer from the polymerization medium, wherein the polymer thermal stabilizer mixture comprises:
  a) a perchlorate compound or salt thereof, and
  b) an alkanolamine of the formula (I)

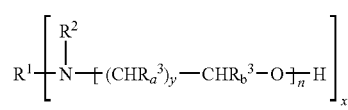

where
  x=1, 2 or 3;
  y=1, 2, 3, 4, 5 or 6;
  n=from 1 to 10;
  $R^1$, $R^2$=independently of one another, H, $C_1$-$C_{22}$-alkyl,
    —[—$(CHR^3{}_a)_y$—$CHR^3{}_b$—O—$]_n$—H, —[—$(CHR^3{}_a)_y$ —CHR$^3_b$—O—]$_n$—CO—R$_4$, C$_2$-C$_{20}$-alkenyl, C$_2$-C$_{18}$-acyl, C$_4$-C$_8$-cycloalkyl, which may be OH-substituted in the β position, C$_6$-C$_{10}$-aryl, C$_7$-C$_{10}$-alkaryl or C$_7$-C$_{10}$-aralkyl, or when x=1, R$^1$ and R$^2$ may additionally combine with the N to form a closed 4-10-membered ring of carbon atoms and optionally up to 2 heteroatoms, or when x=2, R$^1$ may additionally be C$_2$-C$_{18}$-alkylene which may be OH-substituted at both β-carbon atoms and/or may be interrupted by one or more O-atoms and/or one or more NR$_2$ groups, or dihydroxy-substituted tetrahydrodicyclopentadienylene, dihydroxy-substituted ethylcyclo-hexanylene, dihydroxy-substituted 4,4'-(bisphenol A dipropyl ether)ylene, isophoronylene, dimethylcyclohexanylene, dicyclohexylmethanylene, or 3,3'-dimethyldicyclohexylmethanylene, and if x=3, R$^1$ may also be trihydroxy-substituted (tri-N-propyl isocyanurate)triyl;

R$^3_a$, R$^3_b$=independently of one another, C$_1$-C$_{22}$-alkyl, C$_2$-C$_6$-alkenyl, C$_6$-C$_{10}$-aryl, H or CH$_2$—X—R$^5$, where X=O, S, —O—CO— or —CO—O—;

R$^4$=C$_1$-C$_{18}$-alkyl/alkenyl or phenyl, and

R$^5$=H, C$_1$-C$_{22}$-alkyl, C$_2$-C$_{22}$-alkenyl or C$_6$-C$_{10}$-aryl;

or salt thereof: and (2) adding to the pre-stabilized PVC polymer, after isolation of the polymer from the polymerization medium, one or more additives selected from the group consisting of heat-stabilizers, UV stabilizers, lubricants, plasticizers, pigments, fillers, metal soaps, antioxidants, wetting agents, optical brighteners, and antisettling agents.

2. The process of claim 1 wherein the polymer thermal stabilizer mixture comprises at least a) a perchlorate compound or salt thereof and b) a reaction product of a mono- or polyfunctional epoxide and ammonia or, respectively, a mono- or polyfunctional dialkyl(aryl)- or monoalkyl(aryl) amine, or salt thereof.

3. The process of claim 2, wherein the polyfunctional epoxide is dicyclopentadiene diepoxide, vinylcyclohexene diepoxide, bisphenol A diglycidyl ether or trisglycidyl isocyanurate and the dialkylamine is diethanolamine or diisopropanolamine and the monoalkylamine is monoethanolamine or monoisopropanolamine.

4. The process of claim 1 wherein the perchlorate salt is a compound of the formula M(ClO$_4$)$_n$, where M is H, Li, Na, K, Mg, Ca, Sr, Ba, Zn, Al, La, Ce or NH$_4$ and n is either 1, 2 or 3 as required by the valency of M.

5. The process of claim 1 wherein, in the compound having the general formula (I), R$^3_a$ and R$^3_b$, independently of one another, are H or CH$_3$ and y=1.

6. The process of claim 1 wherein, in the compound having the general formula (I), R$_1$=R$_2$=CH$_2$—CHR$^b_3$—OH.

7. The process of claim 4 wherein, in the perchlorate salt, M=Na or K and n=1.

8. The process of claim 1 wherein the compounds of the general formula (I) are selected from the group consisting of tris(2-hydroxy-1-propyl)amine, tris(2-hydroxy-ethyl)amine, bis(2-hydroxyethyl)-2-hydroxy-1-propylamine, alkyllalkenylbis(2-hydroxyethyl)amine, alkyllalkenyl(2-hydroxy-1-propyl-)-amine, N-(2-hydroxyhexadecyl)diethanolamine,-2-hydroxy-3-octyloxypropyl)-diethan-olamine, N-(2-hydroxy-3-decyloxypropyl)diethanolamine, and mixtures of these.

9. The process of claim 1 wherein the polymer thermal stabilizer mixture is comprised of from 0.01 to 3.00 parts by weight of sodium perchlorate and/or from 0 to 8.00 parts by weight of alkanolamines of the general formula (I) and/or from 0.01 to 5.00 parts by weight of the salts of a) and b), per hundred parts of polymer.

10. The process of claim 1 further comprising the step of subsequently stabilizing the polymer using conventional stabilizers and/or additives.

11. A process for preparing a stabilized suspension/emulsion PVC polymer comprising (1) adding a polymer thermal stabilizer mixture compatible with the polymerization medium prior to, during or directly after the polymerization, prior to the isolation of the polymer from the polymerization medium, wherein the polymer thermal stabilizer mixture comprises:

a) a sodium perchlorate compound or salt thereof, and b) an alkanolamine selected from the group consisting of tris(2-hydroxy-1-propyl)amine, tris(2-hydroxy-ethyl) amine, bis(2-hydroxyethyl)-2-hydroxy-1-propylamine, alkyllalkenylbis(2-hydroxyethyl)amine, alkyllalkenyl (2-hydroxy-1-propyl-)-amine, N-(2-hydroxyhexadecyl)diethanolamine,-2-hydroxy-3-octyloxypropyl)-diethan-olamine, N-(2-hydroxy-3-decyloxypropyl) diethanolamine, and mixtures of these; and (2) adding to the pre-stabilized PVC polymer, after isolation of the polymer from the polymerization medium, one or more additives selected from the group consisting of heat-stabilizers, UV stabilizers, lubricants, plasticizers, pigments, fillers, metal soaps, antioxidants, wetting agents, optical brighteners, and antisettling agents.

* * * * *